United States Patent
Schmitt et al.

(10) Patent No.: US 9,434,230 B2
(45) Date of Patent: Sep. 6, 2016

(54) TORSION BAR SYSTEM FOR A VEHICLE AXLE OF A TWO TRACK VEHICLE

(71) Applicant: AUDI AG, Ingolstadt (DE)

(72) Inventors: Joachim Schmitt, Ingolstadt (DE); Andreas Schindler, Ingolstadt (DE); Christian Isakiewitsch, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/767,947

(22) PCT Filed: Feb. 13, 2014

(86) PCT No.: PCT/EP2014/000390
§ 371 (c)(1),
(2) Date: Aug. 14, 2015

(87) PCT Pub. No.: WO2014/124752
PCT Pub. Date: Aug. 21, 2014

(65) Prior Publication Data
US 2015/0367705 A1 Dec. 24, 2015

(30) Foreign Application Priority Data
Feb. 16, 2013 (DE) .................. 10 2013 002 704

(51) Int. Cl.
*B60G 21/055* (2006.01)
*B60G 11/50* (2006.01)
*B60G 17/02* (2006.01)

(52) U.S. Cl.
CPC ........... *B60G 21/0551* (2013.01); *B60G 11/50* (2013.01); *B60G 17/025* (2013.01);
(Continued)

(58) Field of Classification Search
CPC ............. B60G 21/0551; B60G 11/50; B60G 21/0555; B60G 17/025; B60G 2200/18; B60G 2204/419; B60G 2202/442; B60G 2200/422; B60G 2204/15; B60G 2204/122; B60G 2204/19; B60G 2202/42; B60G 2206/604; B60G 2202/134
See application file for complete search history.

(56) References Cited

U.S. PATENT DOCUMENTS 4,648,620 A * 3/1987 Nuss .................. B60G 21/0553
280/124.106
4,883,289 A * 11/1989 Sardou .................. B29C 70/205
267/273
(Continued)

FOREIGN PATENT DOCUMENTS

DE    102004004335    8/2005
DE    102006004960    8/2007
(Continued)

OTHER PUBLICATIONS

International Search Report issued by the European Patent Office in International Application PCT/EP2014/000390.

*Primary Examiner* — Darlene Condra
(74) *Attorney, Agent, or Firm* — Henry M. Feiereisen LLC.

(57) ABSTRACT

A torsion bar system for a vehicle axle, in particular a rear axle, of a two-track vehicle, includes first and second rotary actuators, each of which is associated with a vehicle side, for an active suspension control. Each rotary actuator has at least one motor/gear unit with which torques can be generated and transmitted as actuating forces onto a wheel suspension element via an output lever. The motor/gear units of both rotary actuators are arranged in a common housing which is rotationally fixed to the vehicle body. The housing has at least two attachment points for bracing the vehicle body, wherein the attachment points are spaced from one another across a bearing distance, and the housing is mounted on the vehicle body in a rigid assembly via said attachment points.

7 Claims, 4 Drawing Sheets

(52) U.S. Cl.
CPC ....... *B60G21/0555* (2013.01); *B60G 2200/18* (2013.01); *B60G 2200/422* (2013.01); *B60G 2202/134* (2013.01); *B60G 2202/42* (2013.01); *B60G 2202/442* (2013.01); *B60G 2204/122* (2013.01); *B60G 2204/15* (2013.01); *B60G 2204/19* (2013.01); *B60G 2204/419* (2013.01); *B60G 2206/604* (2013.01)

(56) References Cited

U.S. PATENT DOCUMENTS

| | | | | |
|---|---|---|---|---|
| 5,697,847 | A * | 12/1997 | Meyer | F16D 3/80 464/160 |
| 6,832,772 | B2 * | 12/2004 | Conover | B60G 17/025 280/124.106 |
| 7,500,686 | B2 | 3/2009 | Münster | |
| 8,511,697 | B2 | 8/2013 | Ohletz | |
| 8,648,505 | B2 | 2/2014 | Memminger et al. | |
| 8,686,607 | B2 | 4/2014 | Memminger et al. | |
| 2007/0001417 | A1 * | 1/2007 | Minoshima | B60G 21/0555 280/124.107 |
| 2007/0024044 | A1 * | 2/2007 | Ogawa | B60G 3/20 280/788 |
| 2007/0201945 | A1 * | 8/2007 | Scharioth | B60G 7/001 403/132 |
| 2008/0258417 | A1 * | 10/2008 | Cordier | B60G 3/20 280/124.109 |
| 2011/0089658 | A1 * | 4/2011 | Buhl | B60G 17/0277 280/124.106 |
| 2011/0127705 | A1 * | 6/2011 | Whitaker | F16F 1/16 267/154 |
| 2011/0278812 | A1 * | 11/2011 | Ohletz | B60G 11/183 280/124.106 |
| 2011/0278969 | A1 | 11/2011 | Memminger et al. | |
| 2013/0154429 | A1 | 6/2013 | Schonbauer | |
| 2014/0145423 | A1 | 5/2014 | Elias et al. | |
| 2014/0232083 | A1 | 8/2014 | Mohrlock et al. | |
| 2014/0319787 | A1 | 10/2014 | Mohrlock et al. | |

FOREIGN PATENT DOCUMENTS

| | | |
|---|---|---|
| DE | 102009005895 | 7/2010 |
| DE | 102009005898 | 7/2010 |
| EP | 1364816 | 11/2003 |
| EP | 1686042 | 8/2006 |
| EP | 2093131 | 8/2009 |
| EP | 2517905 | 10/2012 |
| JP | H07266836 | 10/1995 |
| WO | WO96/00661 | 1/1996 |

* cited by examiner

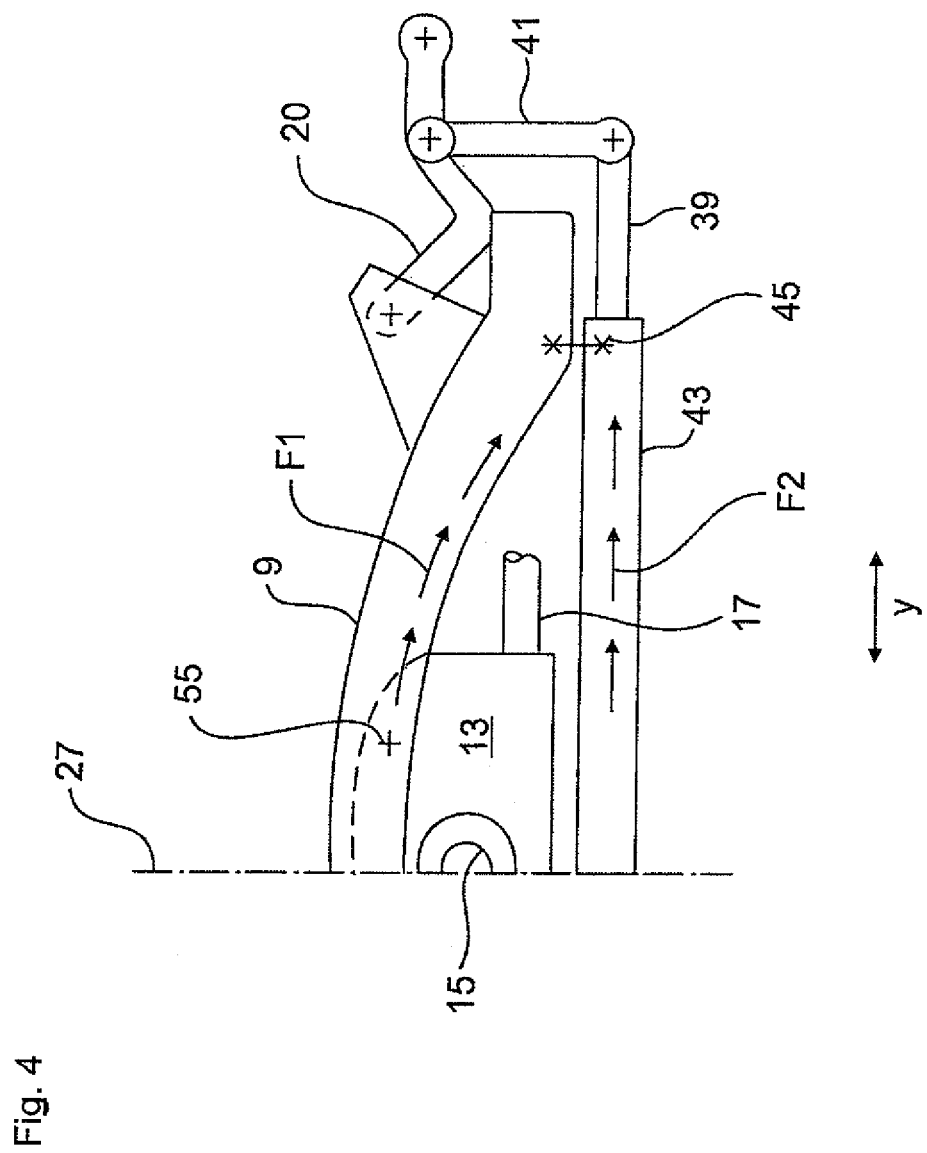

TORSION BAR SYSTEM FOR A VEHICLE AXLE OF A TWO TRACK VEHICLE

CROSS-REFERENCES TO RELATED APPLICATIONS

This application is the U.S. National Stage of International Application No. PCT/EP2014/000390, filed Feb. 13, 2014, which designated the United States and has been published as International Publication No. WO 2014/124752 and which claims the priority of German Patent Application, Serial No. 10 2013 002 704.7, filed Feb. 16, 2013, pursuant to 35 U.S.C. 119(a)-(d).

BACKGROUND OF THE INVENTION

The invention relates to a torsion bar system for a vehicle axle, in particular a rear axle, of a two-track vehicle.

Such a torsion bar system is used in an active suspension control, in which a rotary actuator is assigned to each wheel suspension of the rear axle. Depending on activation, the two rotary actuators of the vehicle axle can be used to modify the ride height and/or to compensate pitch and roll movements of the vehicle.

DE 10 2009 005 895 A1 discloses a generic torsion bar system with a two-part stabilizer. The torsion bar system has a first rotary actuator and a second rotary actuator which are associated to vehicle sides, respectively. Each of the rotary actuators includes a motor-gear unit to generate the torques which are transmitted via a torsion bar and an output lever as actuating forces to a wheel suspension element of the vehicle axle. The motor-gear units of the two rotary actuators are arranged in a common housing which is mounted in fixed rotative engagement centrally to a cross member of a frame-shaped axle support or a subframe. The subframe, in turn, can be connected in a manner known per se to body-side longitudinal members of the vehicle body.

In particular when a driven rear axle is involved, a gear unit and/or an electric motor can be mounted between the longitudinal and transverse members of the subframe in driving relationship with the rear wheels via articulated shafts. During travel, such drive components introduce operating forces into the subframe. For reliably absorbing these operating forces, the subframe is of complex construction and incurs substantial material costs to realize sufficient structure stiffness.

SUMMARY OF THE INVENTION

The object of the invention is to provide a torsion bar system for a vehicle axle with lesser material and construction costs and yet sufficient structure stiffness.

The object is achieved by a torsion bar system for a vehicle axle, in particular rear axle, of a two-track vehicle, including first and second rotary actuators, respectively associated with a vehicle side, for an active suspension control, each rotary actuator including at least a motor-gear unit to allow generation of the torques which are transmittable via an output lever as actuating forces onto a wheel suspension element, with the motor-gear units of the two rotary actuators being arranged in a common housing which is mounted in fixed rotative engagement to the vehicle body, with the housing for stiffening the vehicle body having at least two attachment points which are spaced from one another by a bearing distance and via which the housing is mounted rigidly to the vehicle body, wherein the vehicle body includes a subframe to which the common housing is mounted, and the subframe has two longitudinal members and at least one cross member, wherein the common housing is arranged in the vertical direction in alignment below the cross member of the subframe, thereby forming a double support, in which the common housing is mounted as an additional crossbeam on the subframe, and that the cross member of the subframe has an attachment point for a drive component, and wherein the attachment point for the drive component is arranged in the vehicle transverse direction between the attachment points of the common housing.

Preferred refinements of the invention are disclosed in the dependent claims.

The invention is based on the basic idea that the torsion bar system attached to the vehicle axle is adjusted such that the structure stiffness of the subframe can be increased without the need for additional reinforcement elements or additional material. Against this background, the common housing for the two motor-gear units of the rotary actuators is mounted in fixed rotative engagement to the vehicle body via two attachments points which are spaced from one another by a bearing distance. The common housing thus forms an additional load path during travel. This additional load path can be used to further transmit operating forces and, therefore, the vehicle body can be relieved from forces in the area of the common housing.

As already indicated above, the vehicle body can have, for example, at the rear axle, a subframe with front and/or rear cross members, which are respectively connected to each other by lateral longitudinal members. In this way, a closed frame is established, in which, for example, a rear-axle differential and/or an electric motor is mounted. To reduce the total spring rate of the vehicle, the torsion bar system may additionally include torsion spring elements. In this way, torques generated in the motor-gear unit can be transmitted via the load path motor-gear unit/torsion spring element/output lever/wheel suspension element ultimately as linear actuating forces onto the vehicle wheel. According, to a particularly compact arrangement, the two torsion spring elements can be arranged within the common housing. The common housing can in this case have lateral bearing openings which oppose one another in the vehicle transverse direction and from which the output levers can be guided out, respectively. The bearing openings of the common housing are in particular pivot points defining a rotation axis of the torsion bar system.

The at least one cross-member and/or the two longitudinal members of the subframe can preferably have bearing points to which the common housing with its two attachment points can be secured.

In the case of a driven vehicle axle, a drive component, such as a rear-axle differential or an electric motor, may be directly attached to one of the cross members of the subframe into which increasingly operation forces are introduced during travel. Preferably, the common housing is specifically attached to this cross member. The cross member, to which the drive component is mounted, thus provides a first load path via which the operating forces are introduced from the drive component into the longitudinal members of the subframe. With the assistance of the common housing, a second load path is provided via which the operating forces can also be introduced into the longitudinal members. In this way, the cross member is relieved from forces.

It is particularly preferred when the attachment point is hereby arranged for the drive component in the vehicle transverse direction between the two attachment points of the common housing.

The common housing can be preferably designed as a hollow cylinder, wherein the housing axis can extend in coaxial relationship to the rotation axis of the torsion bar system. In addition, the common housing can be arranged in mirror symmetry to a vertical vehicle longitudinal center plane.

According to one embodiment, the two motor-gear units can be arranged in mirror symmetry to the above longitudinal plane approximately in the center of the vehicle in fixed rotative engagement and rigidly in the common housing. Both motor-gear units can be connected via the interposed torsionally flexible torsion spring elements to the torsionally stiff output levers, respectively, which are each guided through a lateral housing opening up to the wheel suspension element. To reduce space requirement, it is of advantage, when the torsion spring element is not an elongate torsion bar, but rather a compact rotary spring.

According to an alternative embodiment, the positions of the motor-gear unit and the torsion spring element can be swapped. In this case, the respective motor-gear unit is connected via the torsion spring element in a torsionally soft manner to the common housing. The output lever is therefore connected not directly to the torsion spring element, but rather torsionally rigid with an output element of the motor-gear unit.

The respective motor-gear unit can be comprised, by way of example, of an electric motor with a reduction gear (for example a harmonic drive gear). As an alternative, a hydraulic motor may be used instead of the electric motor.

In terms of a particularly rigid design of the subframe, it is of advantage when the common housing is arranged in the vertical direction in alignment below the cross member of the subframe. In this way, a particularly rigid double support, comprised of the cross member and the common housing, can be realized which enables a particularly rigid connection of, for example, a rear-axle differential to the cross member.

The configurations and/or refinements of the invention, as described above and/or set forth in the dependent claims, can—except for example in the cases of definite dependencies or incompatible alternatives—be used individually or also in any combination with each other.

BRIEF DESCRIPTION OF THE DRAWING

The invention and its advantageous configurations and/or refinements as well as their advantages are explained in more detail with reference to the drawings.

It is shown in:

FIG. 4 a schematic front view of one half of the rear axle.

DETAILED DESCRIPTION OF PREFERRED EMBODIMENTS

Figure 1:
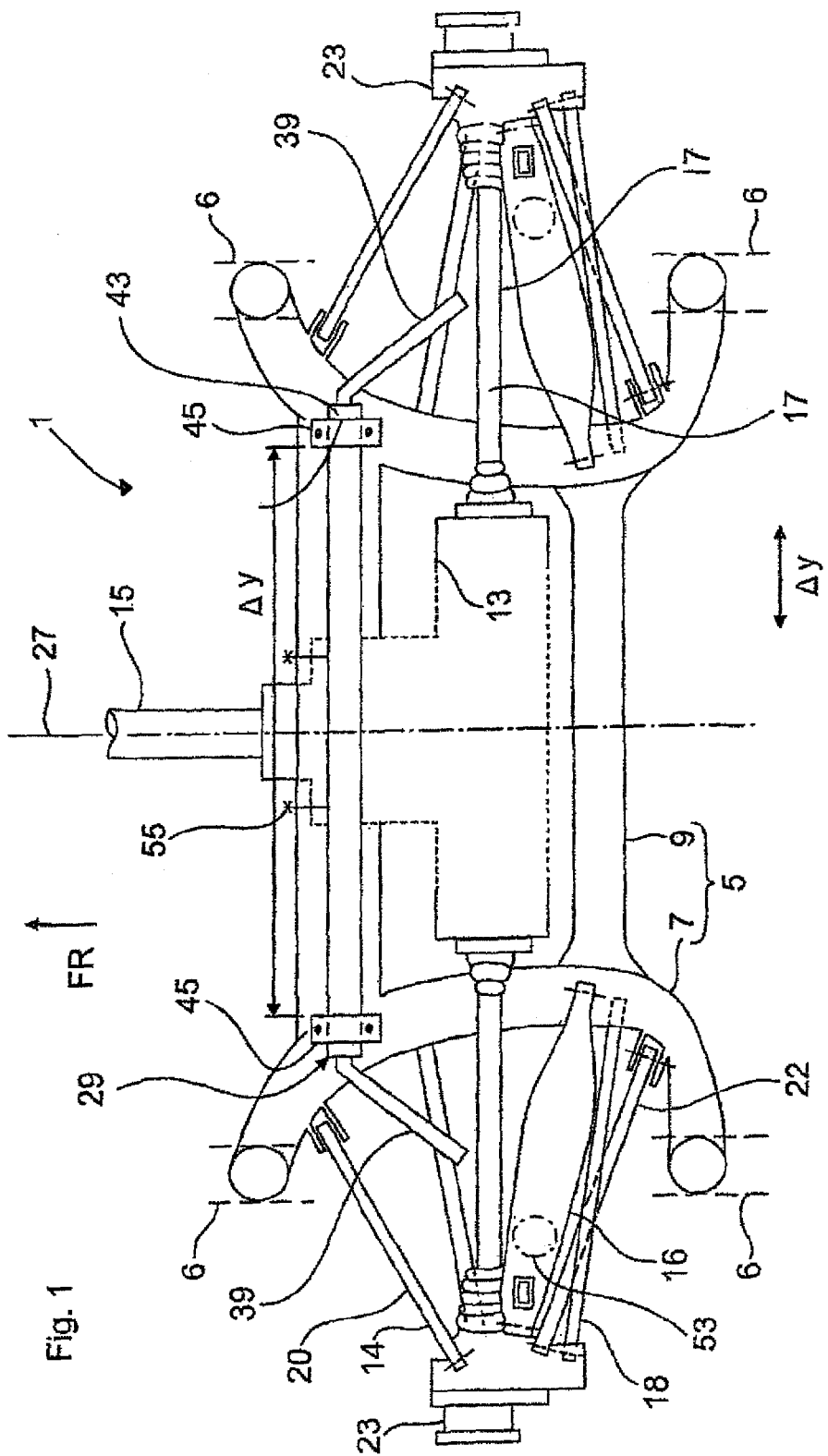
FIG. 1 a bottom view of a driven vehicle rear axle with a torsion bar system.

FIG. 1 shows a bottom view of a driven rear axle for a motor vehicle, depicted only in so far as it is necessary for the understanding of the invention. The rear axle 1 includes a subframe 5, which is composed of longitudinal members 7 as well as front and rear cross members 9. The subframe 5 is attached in a manner known per se to body-side longitudinal members 6 of the vehicle body 11, indicated only by dashed lines (only indicated in the equivalent diagram of FIG. 3). The subframe 5 carries a rear-axle differential 13, which is indicated only by dashed lines and which is connected via a partially shown cardan shaft 15 with a front axle drive of the vehicle. The rear-axle differential 13 is connected via articulated shafts 17 in driving relationship with not shown rear wheels of the vehicle.

Articulated to the two longitudinal members 7 of the subframe 5 for the wheel suspension on both vehicle sides are lower links 14, 16, 18 and upper links 20, 22 in spatially staggered arrangement via not shown link bearings. The links 14 to 22 extend outwards in the vehicle transverse direction y up to the respective wheel carriers 23, which respectively carry a right/left rear wheel 25 (indicated only in FIG. 3) of the motor vehicle. The afore-described structure of the rear axle is configured in mirror symmetry with respect to a vertical vehicle longitudinal center plane 27.

As is further apparent from FIG. 1, the rear axle 1 has a torsion bar system 29 for an active suspension control. According to FIG. 2, the torsion bar system 29 has for each vehicle side a rotary actuator 31, 33. Each of the rotary actuators 31, 33 is composed of a motor-gear unit 35, a torsion spring element 37, and an output lever 39. According to FIG. 4, the output lever 39 is articulated via a coupling rod 41 with the upper lever 20. According to FIG. 2, the components of the torsion bar system 29, with the exception of the torsionally stiff output lever 39, are arranged within a common housing 43. The housing 43 is mounted via bearing brackets 45 to the underside of the subframe, that is immediately below the front subframe cross member 9. The common housing 43 and the two bearing brackets 45 are respectively arranged mirror-symmetrically to the vehicle longitudinal central plane 27, with the two bearing brackets 45 being spaced by a bearing distance Δy from each other and positioned approximately at front corner nodes of the subframe 5.

Figure 2:
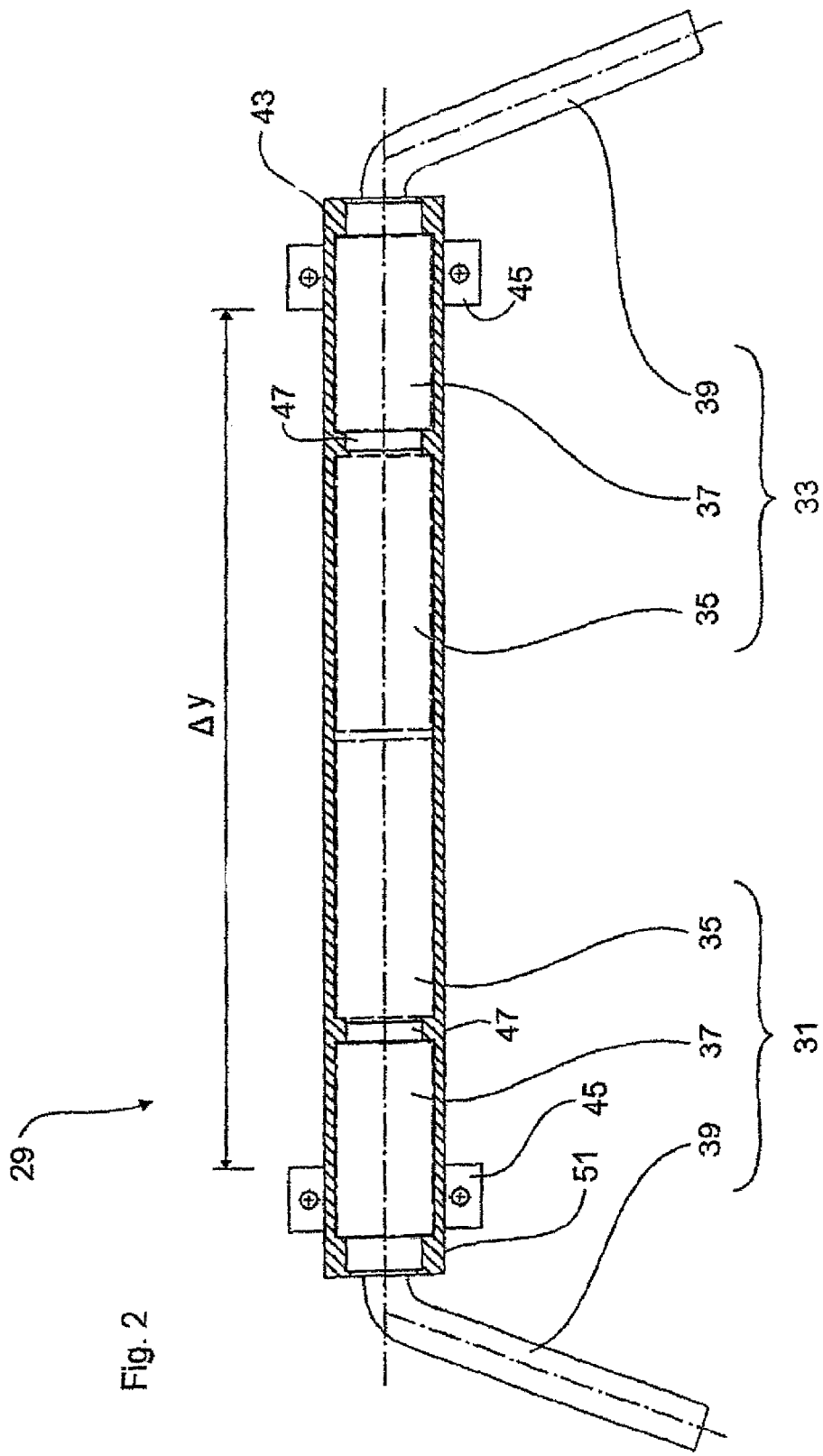
FIG. 2 a partial sectional view of only the torsion bar system for the rear axle.

According to FIG. 2, both motor-gear units 35 are each mounted in fixed rotative engagement within the common housing 43. Each of the motor-gear units 35 is connected via an output shaft, rotatably supported in a bearing 47, with the torsion spring element 37 (i.e. rotation spring), which is attached on the output side to the output lever 39. The latter, in turn, is rotatably supported by and guided to the outside via a housing opening 51. The torsion spring elements 37 and the two motor-gear units are arranged with their rotation axes coaxial with each other in series, so that the overall diameter of the cylindrical common housing 43 is comparably small.

Figure 3:
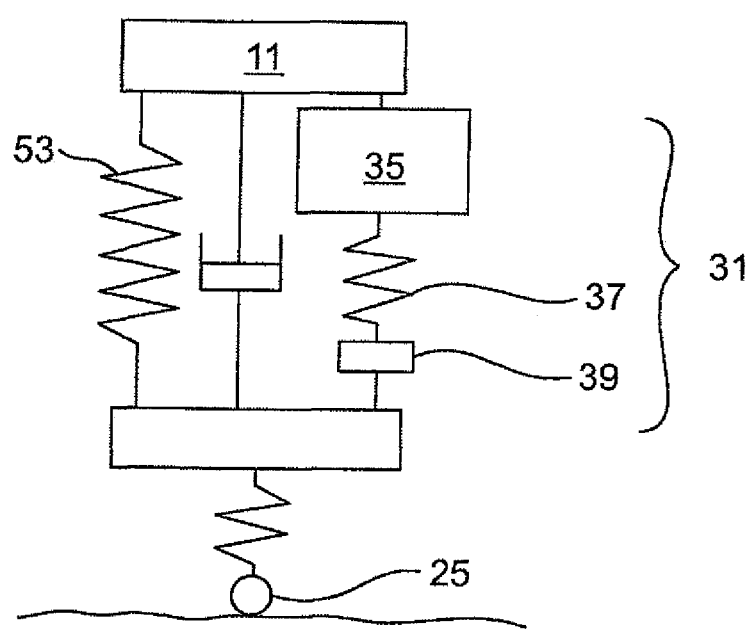
FIG. 3 an equivalent diagram of the rear axle shown in FIG. 1.

FIG. 3 shows by way of an equivalent diagram the interaction of the rotary actuator 31 of the torsion bar system 29 with the support spring 53, only indicated in FIG. 1, of the wheel suspension of the rear axle 1. Accordingly, the support spring 53 and the torsion spring element 37 are effective between the vehicle body 11 and the rear wheel 2 as a spring system connected in parallel, which is determinative for the overall spring rate of the vehicle.

As is further apparent from FIG. 1 and FIG. 4, the rear-axle differential 13 is mounted at attachment points 55 to the front subframe cross member 9. The two attachment points 55 of the rear-axle differential 13 are hereby located, as viewed in the vehicle transverse direction y, between the mounting brackets 45 of the common housing 43.

During travel, the front subframe cross member 9 thus provides a load path F1 via which the operating forces are transferred to subframe longitudinal members. As already mentioned above, the common housing 43 is bolted to the front subframe cross member 9 at node points. Using the thus assembled common housing 43, a second load path F2 is provided. The operating forces are introduced into the subframe longitudinal members 7 via the second load path F2 while reducing stress on the subframe cross member 9.

The invention claimed is:

1. In combination,
   a vehicle body having a subframe comprised of two longitudinal members and at least one cross member which is connected to the longitudinal members, said cross member having an attachment point for a drive component; and
   a torsion bar system for a vehicle axle of a two-track vehicle, said torsion bar system comprising:
   first and second rotary actuators, respectively associated with a vehicle side, for an active suspension control, each rotary actuator including at least a motor-gear unit to allow generation of a torque, and an output lever configured to transmit the torque as actuating force onto a wheel suspension element, and
   a housing mounted in fixed rotative engagement to the vehicle body and accommodating the motor-gear unit of the first rotary actuator and the motor-gear unit of the second rotary actuator, said housing having for stiffening the vehicle body at least two attachment points which are spaced from one another by a bearing distance and via which the housing is mounted rigidly to the subframe of the vehicle body, said housing being arranged in a vertical direction in alignment entirely below the cross member of the subframe, thereby forming a double support, in which the housing is mounted as an additional crossbeam on the subframe, said attachment point of the cross member for the drive component being arranged in a vehicle transverse direction between the attachment points of the housing.

2. The combination of claim 1, wherein the vehicle axle is a rear axle.

3. The combination of claim 1, wherein each of the rotary actuators comprises a torsion spring element for adjusting a spring rate of the torsion bar system, at least one of the torsion spring elements being arranged within the housing.

4. The combination of claim 1, wherein the housing has in the vehicle transverse direction lateral housing openings for passage of the output levers, respectively, said housing openings forming pivot points which define a rotation axis of the torsion bar system.

5. The combination of claim 1, wherein the cross member and/or the two longitudinal members have bearing points for fastening the housing with its two attachment points.

6. The combination of claim 1, wherein the cross member provides a first load path via which an operating force is introducible into the longitudinal members of the subframe, said housing providing a second load path via which the operating force is introducible into the longitudinal members.

7. The combination of claim 1, wherein the subframe has a further cross member which is connected to the longitudinal members so that the subframe has a closed configuration.

* * * * *